Jan. 25, 1966   D. F. FATHAUER ETAL   3,231,814
APPARATUS FOR MEASURING AND RECORDING
CAPACITANCE CHARACTERISTICS
Filed Dec. 27, 1960   2 Sheets-Sheet 1
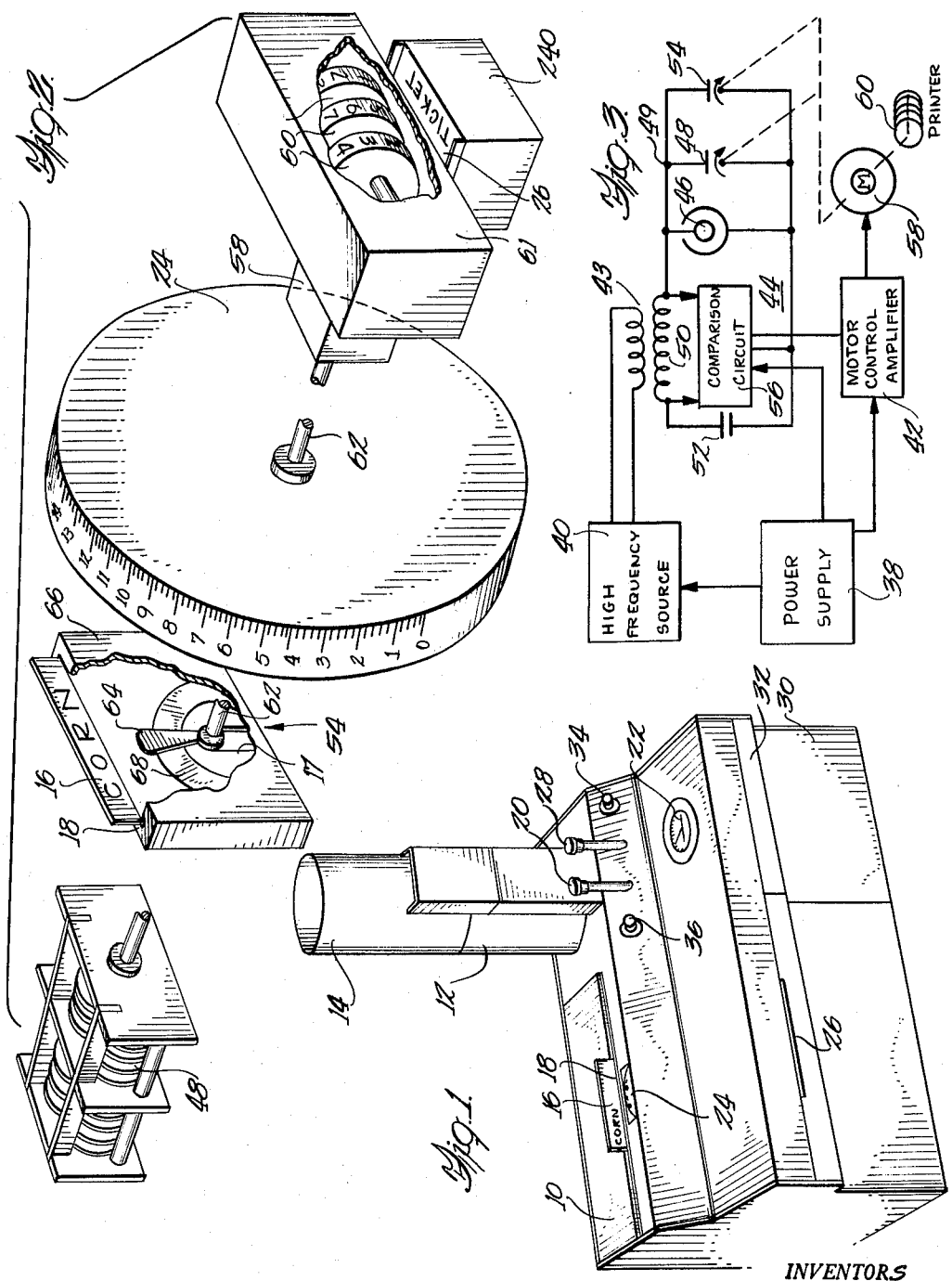
INVENTORS
David F. Fathauer
George H. Fathauer
Olson, Mecklenburger, Von Holst
Pendleton + Neuman
Atty's

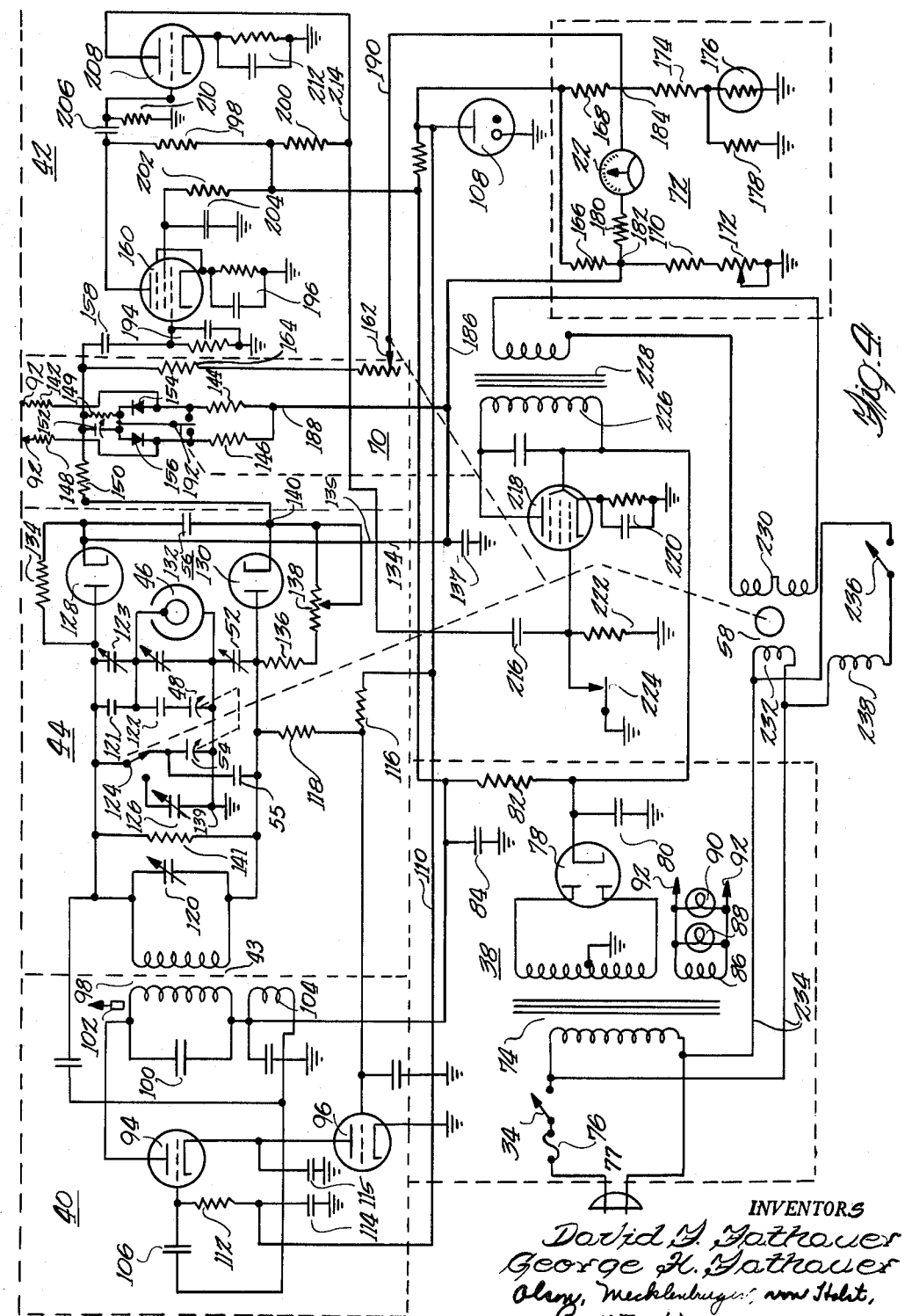

United States Patent Office
3,231,814
Patented Jan. 25, 1966

3,231,814
APPARATUS FOR MEASURING AND RECORDING CAPACITANCE CHARACTERISTICS
David F. Fathauer, Lake City, and George H. Fathauer, Decatur, Ill., assignors to Radson Engineering Corporation, Macon, Ill., a corporation of Illinois
Filed Dec. 27, 1960, Ser. No. 78,566
19 Claims. (Cl. 324—61)

This invention relates to automatic apparatus for accurately measuring and recording data based upon an electrical variable under test and more particularly relates to improved apparatus which is capable of measuring and making a printed record of data relating to one variable where other predictable variables are known and included in the data computation. One such variable is the moisture content of dielectric materials such as grain.

While this invention will be explained in substantial detail with respect to the specific problem of measuring grain characteristics and computing and recording the moisture content of the grain based upon these electrical characteristics, it should be understood that this expedient is employed to better explain the unique theory, function and apparatus of the invention and is not in any way a limitation on the use of the claimed invention.

There are two practicable means for determining the moisture content of grains. The first employs a circuit for determining the electrical resistance of a grain sample which varies with moisture content. However, such a resistance measurement technique is difficult and inaccurate because of the nature of the variables and the difficulty of correlating internal grain moisture and surface moisture. In general where the resistance measurements were employed the grain was ground or otherwise prepared prior to measurement. The second and far more accurate technique involves the employment of a sample of material to be tested as the dielectric between two metallic plates whereby a capacitance is formed. The dielectric constant of grain or any other nonconductive material varies widely with moisture content as the dielectric constant of water is extremely high. While air has a dielectric constant of 1 and the grain when dry has a dielectric constant not substantially different from 1, typical plastic materials such as polyethylene and polystyrene have dielectric constants between 2 and 3 and water has a dielectric constant depending upon its temperature and degree of purity between about 80 and 83. This variation in dielectric constant produces a proportional variation in capacitance when the grain is placed between two metallic plates or surfaces to form a capacitor. The capacitance may then be measured and such a measurement is a direct indication of dielectric constant and consequently is also an indication of moisture content if all variables are taken into account.

The capacitance may be determined in several ways. The capacitor thus formed may be a part of a tuned circuit in an oscillator and the frequency measured or the capacitor may be energized with a known high frequency voltage and capacitance determined by the current flow as a determinant of capacitive impedance. However such techniques are relatively difficult to control and are inaccurate and it is therefore a part of the instant invention to use a capacitance balance circuit analogous to an analytical balance. This capacitance balance technique is the most accurate sensing means available and is set forth in detail in the copending patent application of David F. Fathauer, which has now matured into Patent 3,051,894 issued August 28, 1962, said application being a continuation-in-part of Fathauer application Serial No. 603,534 filed August 13, 1956, and now abandoned.

The heretofore known circuits were critically dependent upon the stability of the voltage source, the frequencies employed, the temperature of the grain, and the stability of the various circuit components. Furthermore, the nature of the equipment heretofore known required extensive data interpretatio nand interpolation where a given capacitance had to be compensated for grain temperature, compaction, the type of grain and the like. Thus in the prior art it is conventional to employ meter faces having a multitude of scales, each calibrated for one particular type of grain. Extensive calculations and paper work may still be required to compensate for compaction and temperature variations.

It is therefore one important object of this invention to provide an automatic measuring device having greatly enhanced accuracy, ease of use, and reliability.

It is another object of this invention to provide an automatic device for measuring the moisture content of comminuted materials such as grains, employing measurements of dielectric constant based upon a balance or cancellation principle and a unique comparison circuit.

It is another object of this invention to provide an improved circuit for automatic moisture measurements and the like which is not critically dependent upon the accurate control of frequencies, supply voltages or component characteristics.

A further object of this invention is to provide a circuit for the determination of moisture content and the like with automatic compensation for variations in the temperature of the material under test and further to provide compensation in the temperature correction based upon the moisture content of the material.

Another object of this invention is to provide automatic means for directly indicating in percentages the amount of moisture contained in a sample of comminuted material such as grain irrespective of the type of grain, the temperature of the grain or the compaction of the grain in the sample under test.

It is another object of this invention to provide means for automatically printing the percentage of moisture in grain samples to within an accuracy in the order of one-tenth of one percent irrespective of the variables of compaction, temperature, grain type and the like.

It is still a further object of this invention to provide electrical and mechanical means for carrying out all of the foregoing objects.

One of the objects of this invention is the provision of simple plug-in means in a variable capacitance for instantaneously changing the nature of the capacitor and the relationship between angular position and capacitance value. Such a relationship is sometimes called taper or tracking characteristic.

It is another object of the invention to provide a plug-in means corresponding to the type of comminuted material under test whereby the relationship of capacitance to moisture content is automatically compensated over the entire range of possible moisture values.

Further and additional objects of this invention will become manifest from a consideration of this specification, the accompanying drawings and the appended claims.

In one form of this invention a compact piece of equipment adapted for counter top use is provided which is adapted to receive a grain sample of known type, provide predetermined compaction in the sample, automatically compensate an electric circuit for the type of material under test, automatically determine the temperature of the sample under test and make circuit corrections in accordance therewith, and compute an immediate indication of moisture content in both visual and printed form to a high degree of accuracy.

For a more complete understanding of this invention reference will now be made to the accompanying drawings wherein:

FIG. 1 is a perspective view of one embodiment of this invention;

FIG. 2 is an exploded diagrammatic view of the tuning condenser, compensating card capacitor, indicating dial, servo-mechanism and ticket printer of the instant invention;

FIG. 3 is a simplified block diagram of the invention; and

FIG. 4 is a detailed circuit diagram of the disclosed embodiment of the invention.

Referring now to the drawings and more particularly to FIG. 1 the illustrated embodiment is contained within a cabinet 10 adapted for counter top use with a grain cell 12 extended upwardly therefrom. Before describing the detailed operation of the equipment, its use can be set forth in general terms. The equipment is energized by turning switch 34 to the "on" position. With any card in slot 18 but no grain in cell 12 balance resistance knob 36 is turned until dial 24 reads "0."

When one wishes to determine the moisture content of a grain sample a measured sample is placed in the cell extension 14 and a card 16 corresponding to the grain type is placed in the slot 18 in the cabinet 10. The lever 20 is then depressed, opening a pair of doors between the cell extension 14 and grain cell 12 whereby the grain is dropped in a carefully predetermined manner to produce a constant and predictable compaction of the grain within the cell 12. The temperature of the grain is automatically sensed and indicated on meter 22. The dial indicator 24 indicates in percentage the moisture content of the grain sample. By placing a card in slot 26 a permanent printed record is formed on the card of the moisture content of the sample under test. Upon completion of the test a second plunger 28 is depressed dropping the grain sample from the cell 12 into a drawer 30 which can be withdrawn and periodically emptied by engaging the handle 32.

The circuit of the instant invention is shown in a generalized or block form in FIG. 3. A power supply 38 energizes a high frequency source 40, a comparison circuit 56 and a motor control amplifier 42. The high frequency source 40 may be any one of many types such as an oscillator of the Hartley or Colpitts types, provided it is reasonably stable. While various frequencies may be employed depending on the material under test it has been found that for normal grain moisture testing a frequency in the order of 10 megacycles is very satisfactory. In the instant embodiment of the invention the high frequency source 40 is coupled through a transformer 43 to the balance circuit 44.

The balance circuit 44 includes the grain cell 46 having a central cylindrical electrode and a surrounding tubular electrode defining an annular grain receiving space. Connected directly in parallel with grain cell 46 are a main variable capacitor 48 and a grain type compensating capacitor 54. The parallel combination of capacitors 46, 48 and 54 is connected in series with a standard capacitor 52 and the secondary winding 50 of transformer 43. These elements constitute the basic balance circuit of the instant invention and correspond to similar circuit elements as set forth in David F. Fathauer United States Letters Patent No. 3,051,894. A comparison circuit 56 is shown connected directly across the standard capacitor 52 and directly across the capacitor network 49 including cell 46, variable capacitor 48 and compensating capacitor 54. The comparison circuit functions in a manner to be described and can be connected across any one of several circuit component combinations in various manners as is set forth in the above identified copending application and as will be apparent from the description which follows. The only critical consideration is that the capacitances 46, 48 and 54 must be a part of the comparison network although they may be in parallel as shown and compared with a standard capacitor such as capacitor 52 or they may be in various series combinations. Use of the described parallel combination has the advantage that the variable capacitor 48 and compensating capacitor 54 are adjusted to be the conjugate of the capacitance of the material in cell 46 and thus the total capacitance of the circuit remains constant in the order of twice the impedance of standard capacitance 52.

The output of comparison circuit 56 is a voltage having amplitude and polarity dependent upon the capacitance deviation in the balance circuit 44. The circuit 44 is designed so that the combination of grain cell 46, compensating capacitor 54 and variable capacitor 48 should have a total capacitance bearing a predetermined constant relationship to standard capacitor 52. In the idealized conditions described this relationship should be one of equality but as will be apparent from the detailed circuitry other reactive components in the balance circuit 44 must be taken into account in arriving at the equality condition. However, the same theory applies, and if a very moist grain sample is placed in cell 46 the capacitance is large and in order to produce a balance the size of variable capacitor 48 must be decreased. Conversely, when there is no grain sample in cell 46 or the sample is very dry the capacitance is reduced and the capacitance of variable capacitor 48 must be increased to balance with standard capacitor 52. To accomplish this balancing quickly, automatically and accurately, a closed loop servomechanism is provided. The output of comparison circuit 56 is applied to the control amplifier 42 and the output thereof in turn energizes servomechanism motor 58. The motor is a bidirectional motor having a relatively high torque to inertia ratio which accurately positions variable capacitor 48 and compensating capacitor 54 to balance the circuit so that the output of comparison circuit 56 reaches a null point at which the motor rests. At the same time the motor 58 drives the indicator dial 24 and a series of movable elements 60 in a printer 61 so that a printed record can be made based upon the moisture content of the material in cell 46 when the circuit is in balance. Several of these mechanical components are better illustrated in FIG. 2.

In FIG. 2 the variable capacitor 48, compensating capacitor 54, dial 24, motor 58 and printer 61 having movable printing elements 60 are indicated in a tandem relationship interconnected by aligned shafts. Variable capacitor 48, compensating capacitor 54 and dial 24 are adapted to rotate through an arc of approximately 180° and through this travel the dial is calibrated to read moisture contents between about 0 and 35%. The dial can be read to an accuracy of about one-tenth of one percent. Motor 58 in moving the dial and capacitors through the described arc makes many revolutions and is connected to shaft 62 through conventional reduction gear means. Motor 58 directly drives the printing wheels of printer 61 and three printing wheels are driven in a coordinated manner to register the moisture percentage in tenths, units and tens. Below the movable elements 60 are a ribbon and platen contained in housing 240. Whenever a card is inserted in slot 26, the platen is moved up against the movable element 60 to make a permanent impression.

The calibrating capacitor 54 has a metallic blade 64 connected to the shaft 62. This blade swings through an arc of about 180° within a housing 66 and is grounded. Housing 66 has a slot 18 to receive cards or plates for specific calibration with respect to a known grain. As shown in the diagrammatic view of FIG. 2 a card 16 relating to corn is in place in slot 18. A printed circuit pattern 68 is fixed to the dielectric card 16 and the contour of the arcuate printed circuit 68 determines the capacitance between blade 64 and plate 68. The card 16 has a central recess 17 to accommodate shaft 62 and index the card in proper spaced relationship to blade 64. This capacitance varies with each increment of movement of shaft 62 in accordance with empirically determined grain characteristics. Thus no two grains have precisely the same characteristic relationship between percentage of moisture content and dielectric constant. There are many variables which cause this phenomenon and it has been found through extensive experimentation and testing that each grain has its own compensating curve. From this curve the shape of the printed plate 68 is deduced. The use of interchangeable compensating capacitors such as the plurality of interchangeable cards 16 for different comminuted products with a housing and rotor as shown in FIG. 2 forms an important part of the instant invention and is a principal structure in the computer enabling use of a single automatically compensating moisture indicating scale.

While the particular compensating capacitor disclosed has many advantages, is simple and inexpensive and functions with complete satisfaction, other techniques for accomplishing the same result will become immediately apparent to the skilled technican. For example, the use of interchangeable cams on shaft 62 to continuously adjust the relationship of two condenser plates or to insert reactance in the circuit would be a change clearly within the skill of a technician in this field.

The circuit diagram shown in detail in FIG. 4 constitutes one embodiment of the invention having many special advantages. While certain of these advantages have already been described, others will become apparent from the detailed description which follows. The circuit includes the following basic units: a power supply 38, a high frequency source 40, a balance circuit 44, a modulator 70, an amplifier 42, a temperature compensation network 72 and a motor 58. The power supply may be of any conventional type providing the necessary voltages and current capacities with reasonable regulation. In the illustrated embodiment a power transformer 74 is energized through the on-off switch 34 and the fuse 76 from a commercial power source symbolized by plug 77. A high voltage winding of transformer 74 is connected to a full wave rectifier 78, the positive output of which is applied to a filter including a large capacitor 80, a series resistance 82 and a second large capacitor 84. The output voltage may be in the order of 250 volts. Transformer 74 also has a filament winding 86 which energizes lamps 88 and 90. These lamps illuminate the temperature meter 22 and the moisture dial 24. As indicated by arrowheads 92 the filament supply is also connected to modulator 70.

Oscillator 40 includes a triode 94 which is one-half of a dual purpose tube including a second triode section 96 employed as a stabilizing element. The plate of triode 94 is connected to a tuned circuit including the primary of a coupling transformer 98 and condenser 100. The circuit may be turned by the movement of magnetic slug 102 in the transformer primary. Oscillation is maintained through inductive feedback to the grid of triode 94 from transformer 104 in what may be termed a modified tuned plate oscillator. The feedback voltage is coupled to the grid through a coupling condenser 106. The grid of tube 94 has a D.C. return to a voltage regulating gas tube 108 through conductor 110 and resistor 112. Condensers 114 and 115 provide a bypass to ground for the grid and cathode circuits. The cathode of triode 94 is connected directly to the plate of triode 96 which provides a variable cathode load for regulatory purposes. The cathode of tube 96 is grounded while the grid of that tube is connected through a very large resistor 116 to the regulated power supply provided by gas tube 108. A relatively small resistor 118 is connected between the grid and the balance circuit 44 which in turn provides a D.C. return to ground. Because of the relative magnitude of resistors 116 and 118 and the return to ground the grid of triode 96 is maintained at a very slight negative potential. Triode 96 thus stabilizes the oscillator 40 by compensating for tube aging and the like through variation in the cathode bias on tube 94 and produces a signal of compensated amplitude in balance circuit 44.

The components of the oscillator are selected in accordance with well known principles to provide an oscillatory frequency in the order of ten megacycles. The oscillatory energy is coupled to the balance circuit 44 by the transformer 98, the secondary of which is in a tank circuit with variable capacitor 120, the circuit being tuned to approximately the oscillator frequency for maximum circuit sensitivity.

Placed in parallel with this tank circuit is the network of capacitors forming the heart of the balance circuit. Two of these capacitors, namely, variable capacitor 48 and compensating capacitor 54, and a switch 124 for calibrating capacitor 126 are controlled by motion of motor 58, as diagrammatically shown by the broken lines. Capacitor 48 is the variable capacitor in series with a fixed capacitor 122 and these two capacitors constitute the main balancing leg of the network in parallel with grain cell 46 as shown in FIG. 3. The compensating capacitor 54 is normally connected in parallel with the variable capacitor through motor driven switch 124 as shown in FIG. 4. Switch 124 remains in the position shown for all conditions other than a "0" moisture indication so that compensating capacitor 54, which includes the plug-in card uniquely designed for a particular grain remains in the circuit whenever a reading is taken. However whenever the dial approaches a "0" percentage indication, motor 58 actuates switch 124 to the alternate position placing an adjustable calibrating capacitor 126 in the balance network in place of compensating capacitor 54 and leaves capacitor 54 in series with a small capacitor 55 in parallel with the standard capacitor 52. The standard capacitor 52 is used as a standard reference in adjusting capacitors 48 and 54 to balance or offset the effect of the capacitance of grain cell 46. Capacitors 121 and 123 are used to adjust the total capacitance of the circuit and obtain desired tracking.

The operation of the balance circuit is much the same as the operation of an analytical balance where a standard is placed on one end of the beam and balanced with the unknown and a group of small known weights.

To determine the balance of the circuit 44, the oscillatory voltage is detected or rectified by the comparison circuit 56. The comparison circuit includes diodes 128 and 130 which are connected in back to back relationship across the tuned circuit with a large capacitor 132 therebetween. A resistor 134 is connected in shunt across diode 128 and a network including resistor 136 and rheostat 138 is connected in parallel with diode 130. As explained in careful detail in Fathauer application Serial No. 765,714, now U.S. Patent No. 3,051,894 opposite D.C. currents are passed by the two diodes 128 and 130 to charge a very large capacitor 132. The common connection between standard capacitor 52 and the capacitor network including grain cell 46 and variable capacitor 48 is connected to ground at 139 and an A.C. ground is provided at the cathode of diode 128 through a very large capacitance 137 and conductor 135. The cathode of diode 130 is also at an A.C. ground through large capacitor 132. Thus unilateral current will flow in alternate half cycles through the diodes 128 and 130 producing a net charge on condenser 132.

The magnitude of current in diode 128 during the positive half cycle will depend upon the voltage appearing across the capacitor network including grain cell 46 and consequently depends upon the relative impedance of that network. Conversely the current in diode 130 is dependent upon the voltage appearing across standard capacitor 52 during the alternate half cycle and thus upon the relative magnitude of the standard capacitor. The total voltage appearing across the network and capacitor is of course dependent upon the impedances of the entire circuit and upon the oscillator output however these may vary widely without affecting the accuracy of the balance measurements.

In the event that the net magnitude of the capacitance of the network including the variables does not equal the capacitance of standard capacitor 52 a net direct current will charge the large capacitor 132. Once balance is restored, the charge on capacitor 132 will be discharged through the resistor 134 or 136 and 138 and resistor 141 to reduce the unbalance indication to zero. The voltage appearing across condenser 132 is a direct indication of an unbalance between the combination of variable capacitors 48 and grain cell 46 and the standard capacitor 52. If the voltage appearing at junction 140 is positive, the impedance of standard capacitor 52 is greater than the combined effect of the network and variable capacitor 48 should be adjusted downwardly. Conversely, if the voltage appearing at junction 140 is negative, capacitor 48 should be increased.

To automatically accomplish this adjustment of the circuit for balance based upon the D.C. voltage and polarity at junction 140 a modulator, amplifier, and bidirectitonal motor are provided. The modulator 70 is capable of generating a sixty cycle A.C. voltage whose phase is dependent upont the polarity of the D.C. signal at junction 140 and whose amplitude is directly related to the amplitude of the D.C. voltage. To accomplish this the filament voltage of filament winding 86 is applied to a network comprising four series resistors 142, 144, 146 and 148. The four resistors comprise a potential divider with the center point connected to an A.C. ground through conductor 188 and large capacitance 137. In one embodiment capacitance 137 has a value of 100 mfd. The center point is also connected to one midpoint of the temperature bridge 72. Junction 140 is connected through resistor 150 and a network comprising resistor 149 and capacitor 152 to the intermediate point of two series connected diode rectifiers 154 and 156 which are in turn connected across resistors 144 and 146. The completion of this potentiometer circuit is through resistor 164, variable resistor 162 and the temperature bridge 72. With no signal appearing at junction 140 the bias will be such that the modulator will be acting bilaterally and producing no A.C. output. However, when junction 140 shifts to a new level then an A.C. voltage of phase corresponding to the polarity of the error voltage will be passed by diode 154 or 156 and applied through coupling condenser 158 to a vacuum tube 160. This results from a bias on one of the diodes 154 or 156 which renders it nonconductive and thus produces an A.C. voltage at the midpoint.

Temperature compensating network 72 generates a signal voltage directly related to grain temperature and is employed to elminate this variable from the grain cell test. Network 72, rheostat 162 and resistor 164 provide a temperature deviation voltage to supplement the bias in the modulator. Network 72 is a bridge network having substantially equal upper resistor legs 166 and 168 connected together to the voltage regulating tube 108. The two lower legs of the bridge are connected to ground, one leg comprising resistor 170 and calibrating resistor 172. The second leg comprises resistor 174 in series with the combination of thermistor 176 and resistor 178. Connected between the two intermediate points in the bridge is the temperature meter 22 with a series resistor 180. By adjustment of resistor 172, meter 22 renders an accurate indication of the temperature of the grain under test. Thermistor 176 is a temperature sensitive resistance element actually disposed in the grain cell and quickly responsive to grain temperature. As is well understood the voltage at midpoint 182 is predetermined by the components 166, 170 and 172, while the voltage at midpoint 184 is dependent upon the magnitude of thermistor 176, meter 22 indicating the difference between the midpoint potentials. In addition to providing a meter indication the same voltage difference is applied to the modulator through conductors 186, 188 and 190 to provide an additive D.C. voltage to the balance circuit output to provide a temperature signal whereby the error signals appearing at juncture 140 must compensate for temperature variation. To render the moisture indications of the instant circuit even more accurate variable resistor 162 is directly driven by motor 58 so that the resistance varies in direct proportion to the magnitude of the moisture indication. This is the result of the discovery that temperature compensation required for a given grain varies with moisture level. Thus for increasing moisture percentages resistor 162 is automatically adjusted to adjust the voltage division and increase temperature compensation.

Furthermore as indicated by the broken lines, motor 58 drives a normally open single pole double throw switch 192. This switch provides protection for the instrument in the event that through some malfunction or misuse the equipment would continue to operate so that the motor 58 would drive the counter, indicating disk, and capacitors beyond their maximum limits in either direction. When this would otherwise occur, switch 192 is actuated in the appropriate direction to immediately apply a substantial A.C. voltage to the amplifier circuit 42 to drive the motor in the reverse direction and protect the equipment. In the event that the malfunction persists, the equipment would continue to hunt, intermittently actuating switch 192, until the equipment was de-energized or corrected.

Amplifier 160 has a conventional grid network 194, cathode network 196, plate load resistors 198 and 200 and screen grid network including resistor 202 and capacitor 204. The output of this amplifier stage is coupled through condenser 206 to the triode amplifier 208 having a grid resistor 210 and self-biasing cathode network 212. The output of the second stage 208 is applied through conductor 214 and coupling capacitor 216 to the final amplifier stage including pentode 218. Pentode 218 has a self-biasing network 220 and a grid resistor 222. In parallel with grid resistor 222 is a normally closed switch 224 connected between the grid of pentode 218 and ground. Physically switch 224 is disposed in blocking relationship in slot 18 so that the grid of pentode 218 is shorted and the motor deactouried unless some card 16 is in slot 18. When a card is inserted, switch 224 is open and the circuit is operative. In that event the sixty cycle A.C. signal having a polarity dependent upon the balance error and a magnitude depending upon the magnitude of that error is amplified in pentode 218 and applied to the primary winding 226 of the transformer 228, the secondary of which energizes the sense windings 230 of servomechanism motor 58. The main field winding 232 of motor 58 is energized directly from the sixty cycle A.C. input through conductor 234.

The gain of the three stages of amplifier 42 is such that maximum torque is generated in motor 58 for discrepancies in the balance circuit corresponding to errors in moisture indication of about .3 to .4%. Thus for any errors in excess of that magnitude maximum torque is generated in motor 58 and the motor operates as a linear servomechanism only for a small range of errors less than about .4% moisture error. The motor is capable of adjusting the balance of the capacitive network to an accuracy of approximately .05%. To reduce any hunting about the null value the condenser 152 in the modulator 70 functions as a damping circuit.

A switch 236 is disposed in slot 26 and is normally open. The switch is closed by the insertion of a grain elevator record card or any other recording medium in slot 26. When such a recording medium is inserted a solenoid 238 is energized bringing the platen with the inked ribbon contained in housing 240 as shown in FIG. 2 up against the rotatable wheels 60 to make an impression on the recording medium indicating the precise amount of moisture in the sample tested.

The instant circuit goes far beyond anything heretofore known in its accuracy, degree of compensation for all variables, ease of operation and modes of recording and registering. It will be immediately apparent that many of the features of the instant invention including automatic recording, automatic compensation for variations in material, automatic compensation for the relationship between temperature and moisture and many other features are of substantial value both alone and in the unique combination presented here.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Apparatus for determining the dielectric properties of a material under test comprising capacitance means employing said material as a dielectric, a variable capacitor, means for applying oscillating electrical signals to said capacitance means and said capacitor, sensing means for comparing the electrical signals across said capacitance means and said capacitor to compare the capacitance value of said capacitance means with the capacitance value of said variable capacitor, compensating capacitor means in circuit with said capacitance means, said variable capacitor and said sensing means to alter the output of said sensing means in accordance with the predetermined dielectric nature of the material under test, said compensating capacitor means including a plurality of separate shaped elements, each element having a shape corresponding to the dielectric property of a particular material, and said compensating capacitor means further including a receptacle to selectively receive one of said plurality of shaped elements, the shaped element received in said receptacle determining the magnitude of compensating capacitance of said compensating capacitance means, printing means having movable printing elements to make an impression upon a medium indicating the effective dielectric constant of said material, actuating means to cause said movable printing elements to make an impression on such medium, motive means for driving said variable capacitor and said movable printing elements together, and control means responsive to said sensing means to actuate said motive means in a direction to produce a predetermined relationship between said capacitance values.

2. Apparatus for determining a physical characteristic of a material under test by determining the dielectric properties of said material comprising capacitance means employing said material as a dielectric, a variable capacitor, means for applying oscillating electrical signals to said capacitance means and said capacitor, sensing means for comparing the electrical signals across said capacitance means and said capacitor to compare the capacitance value of said capacitance means with the capacitance value of said variable capacitor, printing means having movable printing elements to make an impression upon a medium indicating the said physical characteristic of said material, actuating means to cause said movable printing elements to make an impression on such medium, motive means for driving said variable capacitor and said movable printing elements, compensating capacitor means including a movable capacitor element driven by said motive means and a relatively fixed capacitor element, a portion of said compensating capacitor means being quickly replaceable, each such portion being unique for a particular material under test, the shape thereof establishing a predetermined relationship between the position thereof and the compensating capacitance, said compensating capacitor means being in a circuit with said capacitance means, said capacitor and said sensing means to alter the output of said sensing means in accordance with the relationship of said physical characteristic to said dielectric property of the material under test, and control means responsive to said sensing means to actuate said motive means in a direction to produce a predetermined relationship between said capacitance values.

3. Apparatus for determining a physical characteristic of a material under test by determining the dielectric properties of said material under test comprising capacitance means employing said material as a dielectric, a variable capacitor, means for applying oscillating electrical signals to said capacitance means and said capacitor, sensing means for comparing the electrical signals across said capacitance means and said capacitor to compare the capacitance value of said capacitance means with the capacitance value of said variable capacitor, printing means having movable printing elements to make an impression upon a medium indicating the physical characteristic of said material, motive means for driving said variable capacitor and said movable printing elements, compensating capacitor means including a rotatable capacitor plate driven by said motive means and a replaceable shaped plate adjacent to said rotatable plate and having a unique shape establishing a predetermined relationship between the position thereof and the compensating capacitance, said replaceable shaped plate being a conductor disposed upon an interchangeable dielectric supporting member, said compensating capacitor means being in a circuit with said capacitance means, said capacitor, and said sensing means to adjust the output of said sensing means in accordance with the relationship of said physical characteristic to said dielectric property of the material under test, temperature responsive means in a circuit with said capacitance means, said capacitor, and said sensing means to compensate the output of said sensing means for variations in the temperature of said material, and control means responsive to said sensing means to actuate said motive means in a direction to produce a predetermined relationship between said capacitance values.

4. Apparatus for determining a physical characteristic of a material under test by determining the dielectric properties of said material under test comprising capacitance means employing said material as a dielectric, a variable capacitor, means for applying oscillating electrical signals to said capacitance means and said capacitor, sensing means for comparing the electrical signals across said capacitance means and said capacitor to compare the capacitance value of said capacitance means with the capacitance value of said variable capacitor, printing means having movable printing elements to make an impression upon a medium indicating the physical characteristic of said material, motive means for driving said variable capacitor and said movable printing elements, compensating capacitor means including a rotatable capacitor plate driven by said motive means and a replaceable shaped plate adjacent to said rotatable plate and having a unique shape establishing a predetermined relationship between the position thereof and the compensating capacitance, said replaceable shaped plate being a conductor disposed upon an interchangeable dielectric supporting member, said compensating capacitor means being in a circuit with said capacitance means, said capacitor, and said sensing means to adjust the output of said sensing means in accordance with the relationship of said physical characteristic to said dielectric property of the material under test, temperature responsive means in a circuit with said capacitance means, said capacitor and said sensing means to compensate the output of said sensing means for variations in the temperature of said material, means varying the output of said temperature responsive means in response to the magnitude of said dielectric properties, and control means responsive to said sensing means to actuate said motive means in a direction to produce a predetermined relationship between said capacitance values.

5. Apparatus for determining the amount of moisture in material under test comprising capacitance means employing said material as a dielectric, a variable capacitor, motor means for driving said variable capacitor through a range of capacitor values, comparison circuit means for generating a voltage related to the instantaneous relationship between said capacitance means and said variable capacitor, means for stopping said motor means when said comparison circuit indicates a predetermined relationship between said capacitance means and said capacitor, printing means having movable printing elements driven by said motor means to indicate the instantaneous capacitance of said variable capacitor, means for momentarily actuating said printing means to make a readable impression on a medium and switch means engageable by said medium and actuated by the positioning of said medium in operative association with said printing means, said switch means energizing said actuating means.

6. The apparatus of claim 5 wherein means is provided for compensating said comparison circuit means for a particular material.

7. The apparatus of claim 6 wherein the means for compensating is a compensation capacitor comprising a rotatable capacitor plate driven by said motor means and a card having a shaped conductive impression thereon removably and interchangeably positioned in electrically spaced relationship with respect to said capacitor plate, said compensation capacitor being connected to said comparison circuit means.

8. The apparatus of claim 5 wherein compensating means is provided for determining the temperature of said material and altering the output of said comparison circuit to compensate for temperature variations in said material.

9. The apparatus of claim 8 wherein said compensating means comprises an electrical network which generates a compensating voltage directly related to the temperature of said material, means for varying said compensating voltage in accordance with the amount of moisture in the material, and means for combining the output of said comparison circuit means and said compensating means to accurately indicate the amount of moisture in said material.

10. The apparatus of claim 7 wherein switch means is provided for actuation by said motor means, and a standard capacitor connected to said comparison circuit through said switch means, said switch means being actuated whenever said variable capacitor is near a position corresponding to zero moisture in said material whereby said calibration capacitor is replaced by said standard capacitor in the zero moisture region.

11. Apparatus for determining the dielectric properties of a material under test comprising capacitance means employing said material as a dielectric, a variable capacitor, a single tuned circuit having circuit components including an inductance, said capacitance means and said variable capacitor, a source of oscillatory electrical energy coupled to said tuned circuit to produce oscillations therein, means for measuring the voltage across said capacitance means and comparing said voltage with the voltage across another component of said circuit, means generating a direct current voltage directly related to the difference between said two voltages, printing means having movable printing elements to make an impression upon a medium indicating the effective dielectric constant of said material, motor means driving said variable capacitor and said movable printing elements, and control means responsive to said direct current voltage to actuate said motor means in a direction to produce a predetermined relationship between said capacitance values.

12. Apparatus for determining the amount of moisture in a material under test comprising capacitance means employing said material as a dielectric, a variable capacitor, a tuned circuit including an inductance connected across a network of capacitors including said capacitance means and said variable capacitor, at least one of said capacitors being connected in series with said capacitance means, a source of oscillating electrical energy coupled to said tuned circuit, separate rectifier means connected across said capacitance means and across said one capacitor in series with said capacitance means, sensing means responsive to the difference between the unilateral current flow in said separate rectifier means to create a signal corresponding in polarity and magnitude to said difference, printing means having movable printing elements to make an impression upon a medium indicating the percentage of moisture in said material, motive means, and means driven by said motive means in response to said sensing means for positioning said movable printing elements and adjusting said variable capacitor to a predetermined relationship with said capacitance means.

13. Apparatus for determining the amount of moisture in grain comprising a conductive test chamber, a central conductive column within and spaced from said chamber, said chamber and column defining capacitance means, the capacitance value of which is dependent upon the grain which may be placed within said chamber, a variable capacitor, a tuned circuit including an inductance connected across a network of capacitors including said capacitance means and said variable capacitor, at least one of said capacitors being connected in series with said capacitance means, a source of oscillating electrical energy coupled to said tuned circuit, separate rectifier means connected across said capacitance means and across said one capacitor in series with said capacitance means, sensing means responsive to the difference between the unilateral current flow in said separate rectifier means to create a signal corresponding in polarity and magnitude to said difference, printing means having movable printing elements to make an impression upon a medium indicating the percentage of moisture in said material, motive means, and means driven by said motive means in response to said sensing means for positioning said movable printing elements and adjusting said variable capacitor to a predetermined relationship with said capacitance means.

14. Apparatus for determining the dielectric properties of a material under test comprising capacitance means employing said material as a dielectric, a variable capacitor, means for applying oscillating electrical signals to said capacitance means and said capacitor, sensing means for comparing the electrical signals across said capacitance means and said capacitor to compare the capacitance value of said capacitance means with the capacitance value of said variable capacitor, printing means having movable printing elements to make an impression upon a medium indicating the effective dielectric constant of said material, motive means for driving said variable capacitor and said movable printing elements, calibrating capacitor means comprising a housing, a shaft rotatably mounted in said housing, a capacitance plate eccentrically mounted on said shaft transversely thereto, a guideway defined in said housing, and a card removably positioned in said guideway adjacent said plate, a conductive pattern being disposed on said card whereby rotation of said capacitance plate produces a varying capacitance between said plate and said pattern, the shape of said pattern being predetermined to provide a predetermined relationship between capacitance and shaft position, said shaft being driven by said motive means and said calibrating capacitance being in a circuit with said capacitance means, said capacitor, and said sensing means to adjust the output of said sensing means in accordance with the dielectric nature of the material under test, and control means responsive to said sensing means to actuate said motive means in a direction to produce a predetermined relationship between said capacitance values.

15. Apparatus for determining the moisture content of a dielectric material and for making a permanent record thereof on a medium, said apparatus comprising capacitance means employing said material as a dielectric, a variable capacitor, a compensating capacitor variable in accordance with the amount of moisture measured by said apparatus in accordance with a predetermined pattern corresponding to said material, sensing means for comparing the capacitance values of said capacitance means, said variable capacitor and said compensating capacitor, marking means having movable printing elements to make an impression upon a medium indicating the percentage of moisture in said material, motive means for driving said variable capacitor, said compensating capacitor and said movable printing elements, and control means responsive to said sensing means to actuate said motive means in a direction to produce a predetermined relationship between said capacitance values.

16. Apparatus for determining the moisture content of a dielectric material and making a permanent record thereof on a medium, said apparatus comprising capacitance means employing said material as a dielectric, a variable capacitor, a compensating capacitor variable in accordance with the nature of said material and the amount of moisture in said material as measured by said apparatus, circuit means interconnecting said capacitance means and said capacitors in a tuned circuit, means for circulating high frequency energy in said tuned circuit, means sensing the electrical signals in said tuned circuit and generating a signal directly related to the relationship of the capacitances of said capacitance means and said capacitors, means for altering said signal according to the temperature of said material, and means responsive to said altered signal for driving said variable capacitor and said compensating capacitor to establish a predetermined relationship between said capacitances.

17. Apparatus for determining the moisture content of a dielectric material and making a permanent record thereof on a medium, said apparatus comprising capacitance means employing said material as a dielectric, a variable capacitor, a compensating capacitor variable in accordance with the nature of said material and the amount of moisture in said material as measured by said apparatus, circuit means interconnecting said capacitance means and said capacitors in a tuned circuit, means for circulating high frequency energy in said tuned circuit, means sensing the electrical signals in said tuned circuit and generating a signal directly related to the relationship of the capacitances of said capacitance means and said capacitors, means for altering said signal according to the temperature of said material, a marking device having movable marking elements, and means responsive to said altered signal for driving said variable capacitor and said compensating capacitor to establish a predetermined relationship between said capacitances and to drive said movable marking elements to predetermined positions to produce a permanent record of said moisture content.

18. Apparatus for determining a physical characteristic of a material under test which bears a known relationship to the dielectric properties thereof comprising capacitance means employing said material as a dielectric, a variable capacitor, means for applying oscillatory electrical signals to said capacitance means and said capacitor, sensing means for comparing the electrical signals across said capacitance means and said capacitor to compare the capacitance values thereof, compensating capacitor means in circuit with said capacitance means, said variable capacitor and said sensing means to alter the output of said sensing means in accordance with the predetermined dielectric nature of the material under test, said compensating capacitor means including a plurality of separate shaped elements, each element having a shape corresponding to the dielectric property of a particular material, and said compensating capacitor means further including a receptacle to selectively receive one of said plurality of shaped elements, the shaped element received in said receptacle determining the magnitude of compensating capacitance of said compensating capacitance means, read-out means calibrated in terms of said physical characteristic, said variable capacitor and read-out means being driven together whereby said read-out means indicates said physical characteristic in accordance with a predetermined indication of said sensing means.

19. The apparatus of claim 7 including switch means in said apparatus actuated in response to a card being positioned in a predetermined spaced relationship to said rotatable plate, said switch means being connected to control said motor means whereby said motor means is actuated by said switch means only when said card is in said predetermined spaced relationship.

References Cited by the Examiner
UNITED STATES PATENTS

| | | | |
|---|---|---|---|
| 1,223,384 | 4/1917 | Hall | 324—13 |
| 1,748,345 | 2/1930 | Hellmann | 317—253 |
| 1,749,042 | 3/1930 | Marshall | 317—253 |
| 2,233,776 | 3/1941 | Foster | 317—249 |
| 2,588,882 | 3/1952 | Rolfson | 324—61 |
| 2,607,828 | 8/1952 | Razek | 324—61 |
| 2,718,620 | 9/1955 | Howe | 324—61 |
| 2,759,147 | 8/1956 | Stein | 324—61 |
| 2,920,272 | 1/1960 | Erdman et al. | 324—61 |
| 2,962,641 | 11/1960 | Maltby et al. | 324—99 |
| 3,077,561 | 2/1963 | Revesz | 323—75 |
| 3,085,194 | 4/1963 | Revesz | 323—75 |

WALTER L. CARLSON, *Primary Examiner.*

SAMUEL BERNSTEIN, *Examiner.*

M. SHARP, C. A. S. HAMRICK, W. H. BUCKLER,
*Assistant Examiners.*